(12) United States Patent
Fitzgerald et al.

(10) Patent No.: US 8,151,662 B2
(45) Date of Patent: Apr. 10, 2012

(54) ELECTRIC DUAL INPUT CLUTCH TRANSMISSION

(75) Inventors: Brian M. Fitzgerald, Cazenovia, NY (US); David W. Wenthen, Syracuse, NY (US)

(73) Assignee: Magna Powertrain USA, Inc. MI (US)

( * ) Notice: Subject to any disclaimer, the term of this patent is extended or adjusted under 35 U.S.C. 154(b) by 499 days.

(21) Appl. No.: 12/410,527

(22) Filed: Mar. 25, 2009

(65) Prior Publication Data

US 2009/0241728 A1 Oct. 1, 2009

Related U.S. Application Data

(60) Provisional application No. 61/040,780, filed on Mar. 31, 2008.

(51) Int. Cl.
*F16H 3/08* (2006.01)
(52) U.S. Cl. .......................................................... 74/330
(58) Field of Classification Search ................. 74/15.86, 74/330, 331
See application file for complete search history.

(56) References Cited

U.S. PATENT DOCUMENTS

| | | | | |
|---|---|---|---|---|
| 2,306,644 | A * | 12/1942 | Sewell | 74/473.1 |
| 3,057,447 | A * | 10/1962 | Peras | 192/53.2 |
| 3,286,801 | A * | 11/1966 | Wojcikowski | 192/53.331 |
| 5,713,447 | A * | 2/1998 | Skotnicki et al. | 192/53.31 |
| 5,802,915 | A * | 9/1998 | Organek et al. | 74/331 |
| 6,012,561 | A * | 1/2000 | Reed et al. | 192/48.2 |
| 6,092,432 | A * | 7/2000 | Klaricic | 74/325 |
| 6,324,930 | B1 * | 12/2001 | Forsyth | 74/446 |
| 6,354,165 | B1 * | 3/2002 | Schnitzer et al. | 74/333 |
| 6,427,549 | B1 * | 8/2002 | Bowen | 74/331 |
| 6,808,054 | B2 * | 10/2004 | Hirt et al. | 192/48.606 |
| 6,857,513 | B2 * | 2/2005 | Tornatore et al. | 192/48.91 |
| 7,216,560 | B2 * | 5/2007 | Fuhrer | 74/337.5 |
| 7,231,845 | B2 * | 6/2007 | Klaricic | 74/349 |
| 7,472,617 | B2 * | 1/2009 | Nicklass | 74/340 |
| 7,552,658 | B2 * | 6/2009 | Forsyth | 74/329 |
| 7,677,135 | B2 * | 3/2010 | Himmelmann | 74/661 |
| 7,748,286 | B2 * | 7/2010 | Baldwin | 74/330 |
| 7,748,287 | B2 * | 7/2010 | Hatori et al. | 74/340 |
| 7,878,083 | B2 * | 2/2011 | Nicklass et al. | 74/330 |
| 8,011,261 | B2 * | 9/2011 | Diemer et al. | 74/330 |

(Continued)

FOREIGN PATENT DOCUMENTS

| | | |
|---|---|---|
| DE | 19939334 A1 | 3/2001 |
| DE | 10048239 A1 | 10/2001 |
| DE | 102006002943 A1 | 8/2007 |

(Continued)

*Primary Examiner* — Dirk Wright
(74) *Attorney, Agent, or Firm* — Harness, Dickey & Pierce (57) ABSTRACT

A dual transmission includes a first input shaft, a second input shaft, a first input clutch adapted to drivingly couple a power source to the first input shaft and a second input clutch adapted to drivingly couple the power source to the second input shaft. First, third and fifth drive gears are driven by the first input shaft. Second, fourth and sixth drive gears are driven by the second input shaft. First, second, third, fourth, fifth and sixth driven gears selectively drive a countershaft. The first through sixth drive gears are in meshed engagement with the corresponding first through sixth driven gears. First through sixth synchronizer clutches are individually associated with the respective first through sixth drive or driven gears to provide first through sixth gear drive ratios to the countershaft. Each synchronizer clutch is selectively actuated by an associated first through sixth electric actuator.

17 Claims, 6 Drawing Sheets

U.S. PATENT DOCUMENTS

| | | |
|---|---|---|
| 2002/0104397 A1 | 8/2002 | Bowen |
| 2003/0066728 A1 | 4/2003 | Hirt |
| 2005/0252325 A1 | 11/2005 | Stevenson |
| 2005/0261108 A1 | 11/2005 | Kuhstrebe et al. |
| 2007/0214904 A1 * | 9/2007 | Ohnemus ......................... 74/330 |
| 2008/0060461 A1 * | 3/2008 | Hohn ............................... 74/331 |

FOREIGN PATENT DOCUMENTS

| | | |
|---|---|---|
| EP | 1522762 A | 4/2005 |
| FR | 2897407 A | 8/2007 |

* cited by examiner

ELECTRIC DUAL INPUT CLUTCH TRANSMISSION

This application claims the benefits of U.S. Provisional Application No. 61/040,780, filed Mar. 31, 2008.

BACKGROUND

The present disclosure generally relates to transmissions for automotive vehicles. More particularly, an electrically-actuated dual input clutch transmission is disclosed.

A number of vehicles have been assembled with manual transmission or transaxle products. Typically, many development hours and dollars are expended to precisely fit a transmission within a particular vehicle. Components connected to or positioned near the transmission have particular characteristics to function in concert with each other. If a different transmission is subsequently desirable, changes to multiple components may be required depending upon the scope of the change of the transmission.

Furthermore, time and cost may be associated with the design, development and tooling required to produce components within the earlier transmission design. Much of this tooling is dedicated to producing only the particular transmission component for which it was initially constructed. A design change may render this tooling useless.

A number of dual clutch transmissions have been designed to automate the shifting process and provide a power shift between sequentially numbered drive ratios. However, the resulting transmission may be substantially longer than a manual transmission having the same number of drive ratios. A relatively large delay in vehicle production release and increase in cost may result if a change from the standard manual transmission to one of the known dual clutch transmissions is executed. Accordingly, it may be desirable to economically provide an automatic transmission to further advance the field.

SUMMARY

A dual clutch transmission constructed in accordance with the teachings of the present disclosure includes a first input shaft, a second input shaft, a first input clutch adapted to drivingly couple a power source to the first input shaft and a second input clutch adapted to drivingly couple the power source to the second input shaft. First, third and fifth drive gears are driven by the first input shaft. Second, fourth and sixth drive gears are driven by the second input shaft. First, second, third, fourth, fifth and sixth driven gears selectively drive a countershaft. The first through sixth drive gears are in meshed engagement with the corresponding first through sixth driven gears. First through sixth synchronizer clutches are individually associated with the respective first through sixth drive or driven gears to provide first through sixth gear drive ratios to the countershaft. Each synchronizer clutch is selectively actuated by an associated first through sixth electric actuator.

A dual clutch transmission may also include a first input shaft, a second input shaft, a first input clutch adapted to drivingly couple a rotary power source to the first input shaft and a second input clutch adapted to drivingly couple the rotary power source to the second input shaft. A countershaft is driven by first and third speed gearsets associated with the first input shaft as well as second and fourth speed gearsets associated with the second input shaft. A first synchronizer clutch drivingly interconnects one gear of the first speed gearset to the input shaft. A third synchronizer clutch drivingly interconnects one gear of the third speed gearset to the countershaft. The first and third synchronizer clutches are axially positioned between the first and third speed gearsets. The first synchronizer clutch is positioned within a recess formed in the one gear of the first speed gearset. The third synchronizer is positioned within a recess formed in the one gear of the third speed gearset.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
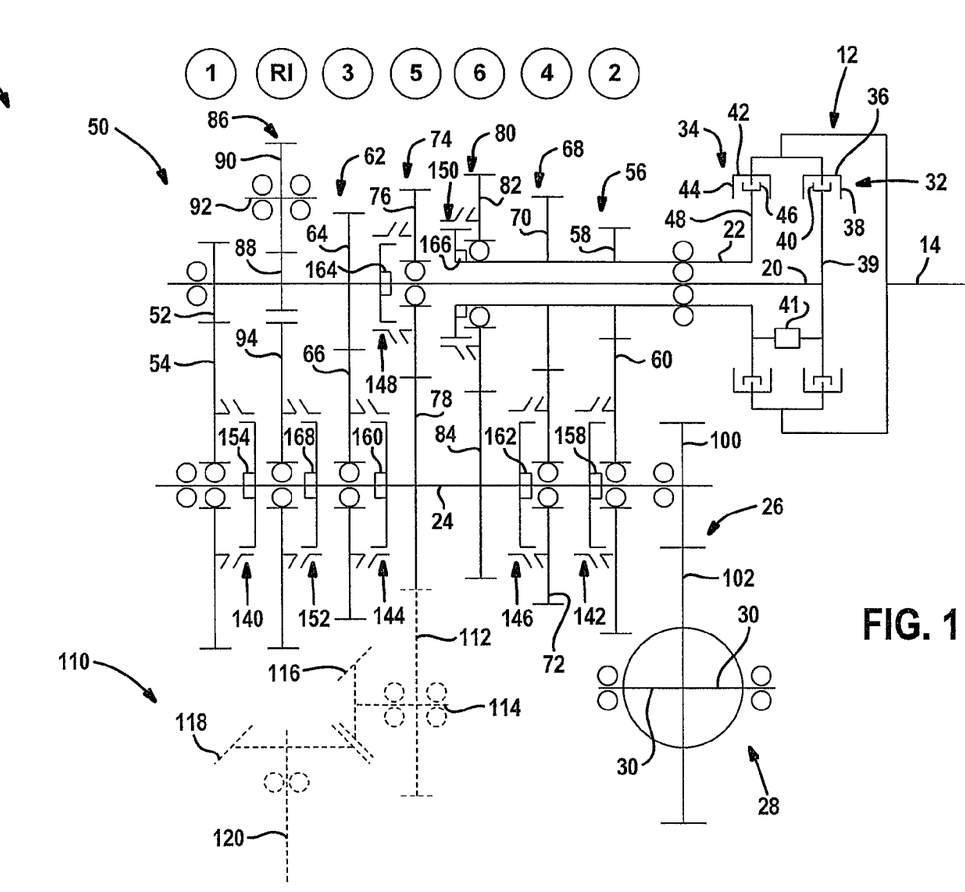
FIG. 1 is a schematic depicting a six-speed, dual clutch transmission constructed in accordance with the teachings of the present disclosure.

FIG. 1 is a schematic representing an automatic transmission 10 having a dual clutch assembly 12 driven by a main shaft 14. During operation of dual clutch assembly 12, torque may be transferred from main shaft 14 to one or both of a first input shaft 20 and a second input shaft 22. Second input shaft 22 is shaped as a tube having at least a portion of first input shaft 20 extending therethrough. Various speed gearsets are selectively operable to transfer torque from one of first input shaft 20 and second input shaft 22 to a countershaft 24. Power is transferred from countershaft 24 through a final drive 26 to a differential assembly 28. Axle shafts 30 are each driven by differential assembly 28 and fixed for rotation with a driven wheel (not shown).

Dual clutch assembly 12 includes a first input clutch 32 and a second input clutch 34. First input clutch 32 is selectively operable to transfer torque from main shaft 14 to first input shaft 20. Similarly, second input clutch 34 is selectively operable to transfer torque from main shaft 14 to second input shaft 22. First input clutch 32 includes a first drum 36 fixed for rotation with main shaft 14. A set of outer first clutch plates 38 are fixed for rotation with and axial movement relative to first drum 36. A set of inner first clutch plates 40 are fixed for rotation with a first hub 39. Inner first clutch plates 40 are axially moveable relative to hub 39 and interleaved with outer first clutch plates 38. Hub 39 is fixed for rotation with first input shaft 20. A power-operated dual clutch actuator 41 is operable to compress outer first clutch plates 38 with inner first clutch plates 40 to transfer torque through first input clutch 32. The power-operated dual clutch actuator may be a purely electrical device, electromechanical or electro-hydraulic without departing from the scope of the present disclosure.

Second input clutch 34 includes a second drum 42 fixed for rotation with main shaft 14. A set of outer second clutch plates 44 are fixed for rotation with and axial movement relative to second drum 42. A set of inner second clutch plates 46 are fixed for rotation with and axial movement relative to a second hub 48. Hub 48 is fixed for rotation with second input shaft 22. Inner second clutch plates 46 are interleaved with outer second clutch plates 44. Dual clutch actuator 41 is operable to cause torque transfer through second input clutch 34 by compressing outer second clutch plates 44 against inner second clutch plates 46.

A first speed gearset 50 transfers torque from first input shaft 20 to countershaft 24 and final drive 26. First speed gearset 50 includes a first drive gear 52 fixed for rotation with first input shaft 20. A first driven gear 54 is supported for rotation on countershaft 24. First drive gear 52 is in constant meshed engagement with first driven gear 54. A second speed gearset 56 includes a second drive gear 58 fixed for rotation with second input shaft 22. A second driven gear 60 is rotatably supported on countershaft 24. Second drive gear 58 is in constant meshed engagement with second driven gear 60. A third speed gearset 62 includes a third drive gear 64 fixed for rotation with first input shaft 20. A third driven gear 66 is rotatably supported on countershaft 24. Third drive gear 64 is in constant meshed engagement with third driven gear 66. A fourth speed gearset 68 includes a fourth drive gear 70 fixed for rotation with second input shaft 22. A fourth driven gear 72 is rotatably supported on countershaft 24. Fourth drive gear 70 is in constant meshed engagement with fourth driven gear 72.

A fifth speed gearset 74 includes a fifth drive gear 76 rotatably supported on first input shaft 20. A fifth driven gear 78 is fixed for rotation with countershaft 24. Fifth drive gear 76 is in constant meshed engagement with fifth driven gear 78. A sixth speed gearset 80 includes a sixth drive gear 82 rotatably supported on second input shaft 22. A sixth driven gear 84 is fixed for rotation with countershaft 24. Sixth drive gear 82 and sixth driven gear 84 are in constant meshed engagement with one another. A reverse gearset 86 includes a reverse drive gear 88 fixed for rotation with first input shaft 20. A reverse idler gear 90 is rotatably supported on an idler shaft 92. Reverse drive gear 88 and reverse idler gear 90 are in constant meshed engagement with one another. A reverse driven gear 94 is rotatably supported on countershaft 24. Reverse driven gear 94 is in constant meshed engagement with reverse idler gear 90 such that countershaft 24 rotates in an opposite direction when in the reverse gear ratio as compared to the sixth speed ratios previously described.

Additionally, final drive 26 includes an output drive gear 100 fixed for rotation with countershaft 24. An output driven gear 102 is fixed for rotation with a member of differential assembly 28. Output drive gear 100 and output driven gear 102 are in constant meshed engagement with one another. As previously mentioned, differential assembly 28 transfers power to axle shafts 30. The gearing arrangement previously described provides six forward drive ratios and one reverse drive ratio for a two-wheel drive powertrain. FIG. 1 depicts an optional hypoid power take-off assembly 110 operable to transfer power from main shaft 14 to another set of driven wheels (not shown). Because hypoid power take-off assembly 110 is optional, its components are shown in hidden line representation. Hypoid power take-off assembly 110 includes an output gear 112 fixed for rotation with a pinion shaft 114. Output gear 112 is in constant meshed engagement with fifth driven gear 78. A pinion gear 116 is formed at one end of pinion shaft 114. A hypoid gear 118 is in constant meshed engagement with pinion gear 116. Hypoid gear 118 is fixed for rotation with an output shaft 120. It is contemplated that output shaft 120 is drivingly coupled to a secondary drive line to provide torque to another set of driven wheels that are not associated with axle shafts 30.

Figure 2:
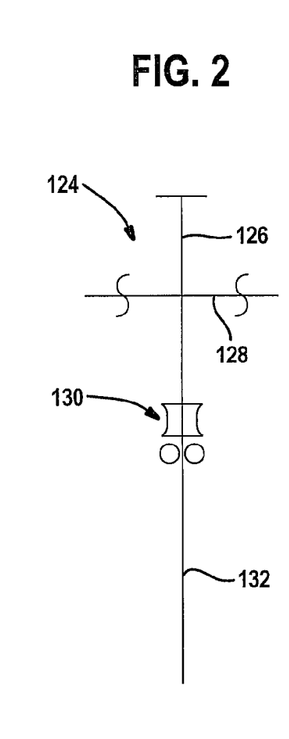
FIG. 2 is a schematic depicting an optional power take-off arrangement for use with the transmission depicted in FIG. 1.

FIG. 2 represents an alternate power take-off assembly 124 operable to transfer torque to another set of driven wheels other than those associated with axle shafts 30. Hypoid power take-off assembly 110 may be replaced with power take-off assembly 124 if a different gear packaging arrangement is desired. Power take-off assembly 124 includes an output gear 126 fixed for rotation with a support shaft 128. A crossed-axis, single enveloping worm gearset 130 transfers torque from output gear 126 to an output shaft 132. Transmission 10 also includes first, second, third, fourth, fifth, sixth and reverse shifting mechanisms that will be described in greater detail hereinafter. The Figures depict first through seventh individual synchronizer clutches 140, 142, 144, 146, 148, 150 and 152, respectively. However, it should be appreciated that a number of other mechanisms such as, for examples, dog clutches, bi-directional clutches or plate clutches may be used.

Operation of transmission 10 includes transferring power from main shaft 14 selectively through various gearsets to provide first through sixth forward drive ratios as well as a reverse drive ratio. To provide power at the first gear drive ratio, a first electric actuator 154 shifts first synchronizer clutch 140 to the left to drivingly interconnect first driven gear 54 and countershaft 24. The remaining synchronizer clutches remain or are moved to a neutral position such that their respective gears are not coupled to the shafts about which they rotate. Due to the dual input shaft arrangement previously described, second synchronizer clutch 142, fourth synchronizer clutch 146 and sixth synchronizer clutch 150 may be in their torque transferring position with no detriment to transmission operation. This may occur because second input clutch 34 will be in its open or disengaged position during transmission operation in its first forward gear ratio. Dual clutch actuator 41 places first input clutch 32 in the engaged or torque transferring position. As such, torque is transferred from main shaft 14 through first input clutch 32 to first input shaft 20. Power continues to flow through first drive gear 52, first driven gear 54, first synchronizer clutch 140, countershaft 24, output drive gear 100, output driven gear 102, differential assembly 28 and axle shafts 30. If transmission 10 is equipped with a power take-off assembly, torque transfers therethrough as well.

Prior to transferring torque through transmission 10 at the second gear drive ratio, a sequential up-shift from the first gear drive ratio to the second gear drive ratio may be anticipated by pre-selecting the position of certain shift mechanisms. To pre-select a sequential up-shift from the first gear drive ratio to the second gear drive ratio, a second electric actuator 158 shifts second synchronizer clutch 142 to drivingly engage second driven gear with countershaft 24.

Transmission 10 provides for power shifting between sequential drive ratio positions. To execute a power shift, a time overlap exists between disengagement of first input clutch 32 and engagement of second input clutch 34. Dual clutch actuator 41 causes simultaneous actuation and de-actuation of the clutches within dual clutch assembly 12 to provide a smooth, uninterrupted flow of power to final drive 26. Once first input clutch 32 is completely disengaged, first synchronizer clutch 140 may be shifted to a neutral position. Because transmission 10 is equipped with a number of synchronizer clutches, pre-selection of a next anticipated gear drive ratio is not required but may be desired to minimize any power flow interruption.

A second gear to third gear shift is similarly accomplished. In particular, the third gear drive ratio may be pre-selected by energizing a third electric actuator 160 to shift third synchronizer clutch 144 to drivingly couple third driven gear 66 with countershaft 24. To shift from second gear to third gear, dual clutch actuator 41 disengages second input clutch 34 while first input clutch 32 is engaged. Once a third gear drive ratio is established, power flows from main shaft 14 through first input clutch 32, first input shaft 20, third drive gear 64, third driven gear 66, third synchronizer clutch 144, countershaft 24 and final drive 26 to differential assembly 28. Once the third gear drive ratio has been established, second synchronizer clutch 142 may be moved to its neutral position.

It should be appreciated that additional sequential up-shifts may be completed in similar fashion to the shifts previously described. Fourth, fifth, sixth and seventh electric actuators 162, 164, 166 168 cooperate with fourth, fifth, sixth and seventh synchronizer clutches 146, 148, 150 and 152 to control synchronized gearshift operation. Furthermore, transmission 10 is operable to shift from an odd numbered gear to an odd numbered gear or an even numbered gear to an even numbered gear due to the presence of the first through sixth synchronizer clutches.

To obtain the reverse gear ratio, seventh synchronizer clutch 152 is actuated by seventh electric actuator 168 to drivingly couple reverse driven gear 94 with countershaft 24. To launch in the reverse direction, first input clutch 32 is engaged. Power is transferred from main shaft 14 through first input clutch 32, first input shaft 20, reverse drive gear 88, reverse idler gear 90, reverse driven gear 94, seventh synchronizer clutch 152, countershaft 24 and final drive 26 to differential assembly 28.

Figure 3:
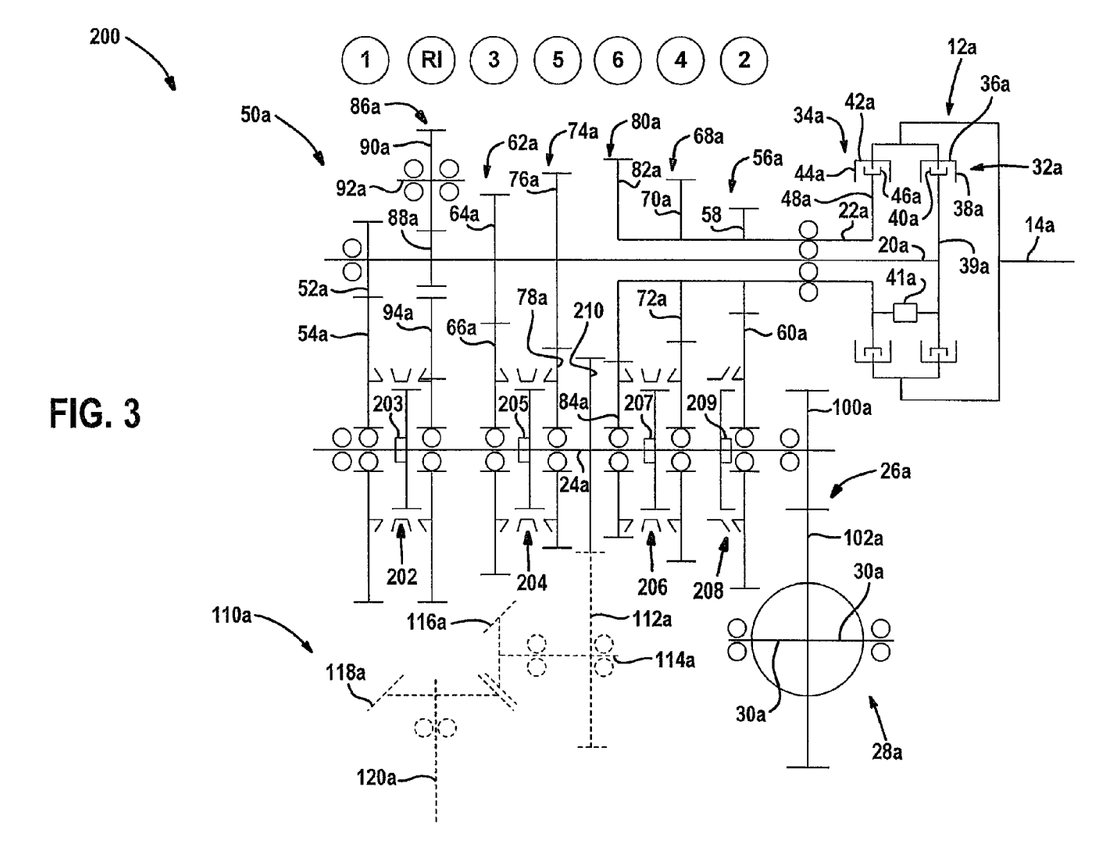
FIG. 3 is a schematic depicting another six-speed dual clutch transmission.

FIG. 3 relates to a six-speed automatic transmission identified at reference numeral 200. Transmission 200 is substantially similar to transmission 10. Accordingly, like elements will retain their previously introduced reference numerals including an "a" suffix. Transmission 200 differs from transmission 10 in that dual or shared synchronizer clutches are used to drivingly interconnect the driven speed gears to countershaft 24a instead of the individual synchronizer clutches previously described. Furthermore, each of second, fourth and sixth drive gears 58a, 70a and 82a are fixed for rotation with second input shaft 22a. In similar fashion, each of first, third, fifth and reverse drive gears 52a, 64a, 76a and 88a are fixed for rotation with first input shaft 20a.

A first dual synchronizer clutch 202 may be selectively moved to one of a leftmost engaged position, a centered neutral position or a rightmost engaged position by a first electric actuator 203. When first dual synchronizer clutch 202 is actuated to move to the leftmost position, first driven gear 54a is drivingly interconnected with countershaft 24a. When first dual synchronizer clutch 202 is moved to its rightmost position, reverse driven gear 94a is drivingly connected to countershaft 24a. When first dual synchronizer clutch 202 is in the centered or neutral position, first driven gear 54a and reverse driven gear 94a are free to rotate about countershaft 24a. In similar fashion, a second dual synchronizer clutch 204 and a second electric actuator 205 are operable to selectively drivingly interconnect third driven gear 66a or fifth driven gear 78a to countershaft 24a depending on its position. A third dual synchronizer clutch 206 and a third electric actuator 207 are selectively operable to drivingly couple fourth driven gear 72a or sixth driven gear 84a to countershaft 24a during actuation of third dual synchronizer clutch 206. A fourth synchronizer clutch 208 and a fourth electric actuator 209 are operable to selectively drivingly interconnect second driven gear 60a and countershaft 24a.

The operation of transmission 200 is substantially similar to that previously described in relation to transmission 10. Therefore, sequential power shifts may be executed by pre-selecting a position of first through fourth synchronizer clutches 202, 204, 206 and 208 as described in relation to the first through seventh synchronizer clutches of transmission 10.

Figure 4:
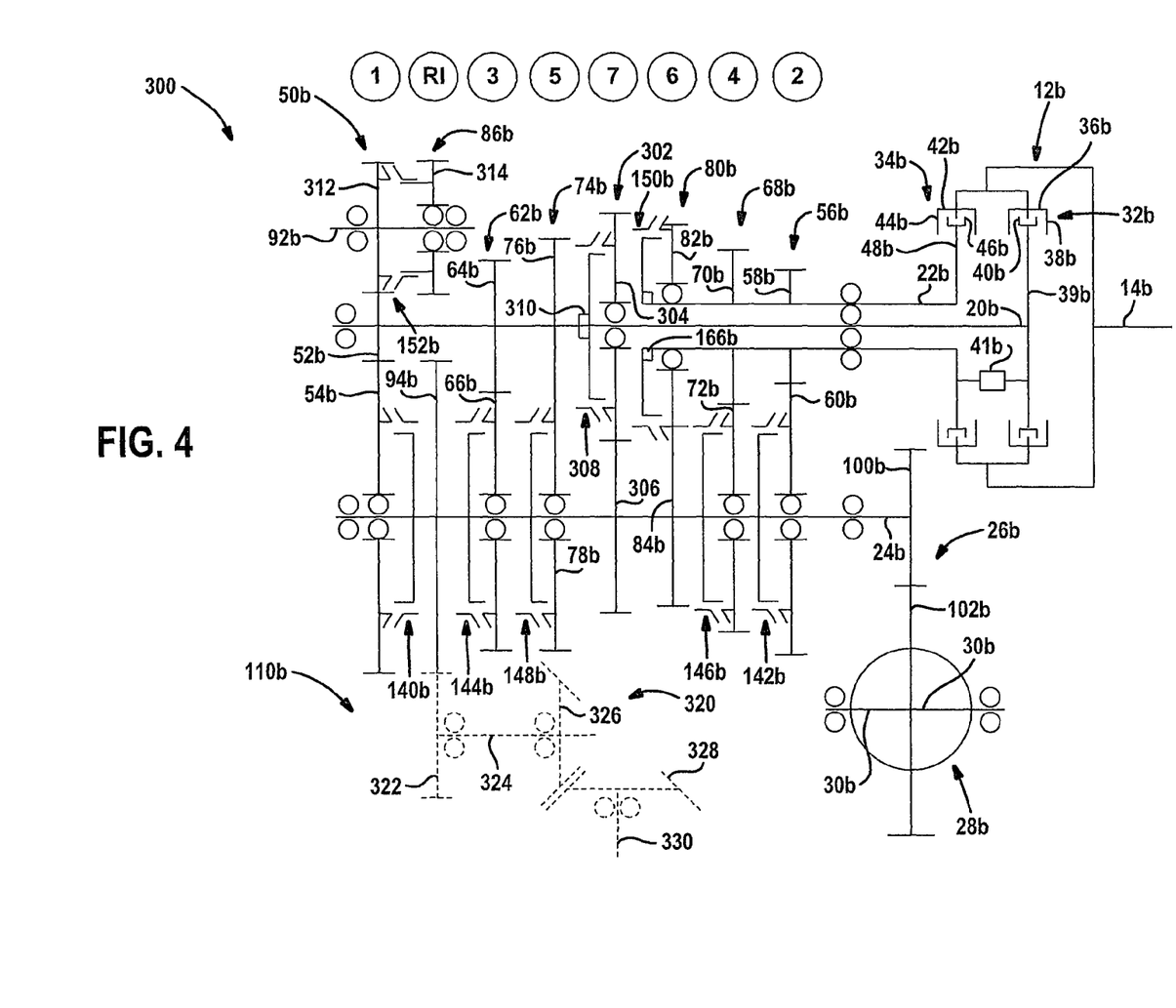
FIG. 4 is a schematic depicting a seven-speed, dual clutch transmission.

FIG. 4 depicts a seven-speed automatic transmission 300 equipped with individual synchronizer clutches associated with each speed gearset. Transmission 300 is substantially similar to transmission 10. As such, like elements will be identified with their previously introduced reference numerals having a "b" suffix. Transmission 300 differs from transmission 10 by including a seventh speed gearset 302 having a seventh drive gear 304 supported for rotation on first input shaft 20b. A seventh driven gear 306 is fixed for rotation with countershaft 24b. Seventh drive gear 304 is in constant meshed engagement with seventh driven gear 306. Additionally, an eighth synchronizer clutch 308 is selectively moveable by an eighth actuator 310 to drivingly interconnect seventh drive gear 304 with first input shaft 20b. Further differences between transmission 300 and transmission 10 include fifth drive gear 76b is fixed for rotation with first input shaft 20b while fifth driven gear 78b is rotatably supported on countershaft 24b. Fifth synchronizer clutch 148b is moved to coordinate with fifth driven gear 78b.

The gears associated with obtaining a reverse gear ratio are also different within transmission 300 when compared to transmission 10. In particular, a first reverse idler gear 312 is fixed for rotation with reverse idler shaft 92b and in constant meshed engagement with first drive gear 52b. A second reverse idler gear 314 is supported for rotation on idler shaft 92b. Second reverse idler gear 314 is in constant meshed engagement with reverse driven gear 94b. Reverse driven gear 94b is fixed for rotation with countershaft 24b. Seventh synchronizer clutch 152b is operable drivingly interconnect second reverse idler gear 314 with idler shaft 92b to define a reverse gear ratio. Torque is transferred through transmission 300 to provide a reverse gear ratio by actuating first input clutch 32b to transfer torque from main shaft 14b through first input clutch 32b, first input shaft 20b, first drive gear 52b, first reverse idler gear 312, seventh synchronizer clutch 152b second reverse idler gear 314, reverse driven gear 94b, countershaft 24b and final drive 26b to differential assembly 28b. Transmission 300 may be equipped with an optional power take-off assembly 320.

Power take-off assembly 320 includes an output gear 322 in constant meshed engagement with reverse driven gear 94b. Output gear 322 is fixed for rotation with a pinion shaft 324 having a pinion gear 326 fixed at one end. A ring gear 328 is in constant meshed engagement with pinion gear 326 to provide torque to an output shaft 330. It should be appreciated that while power take-off assembly 320 is depicted as to include a bevel gear or hypoid gear assembly, other drive arrangements such as the cross axis single enveloping worm gearset 130 may be implemented without departing from the scope of the present disclosure.

Figure 5:
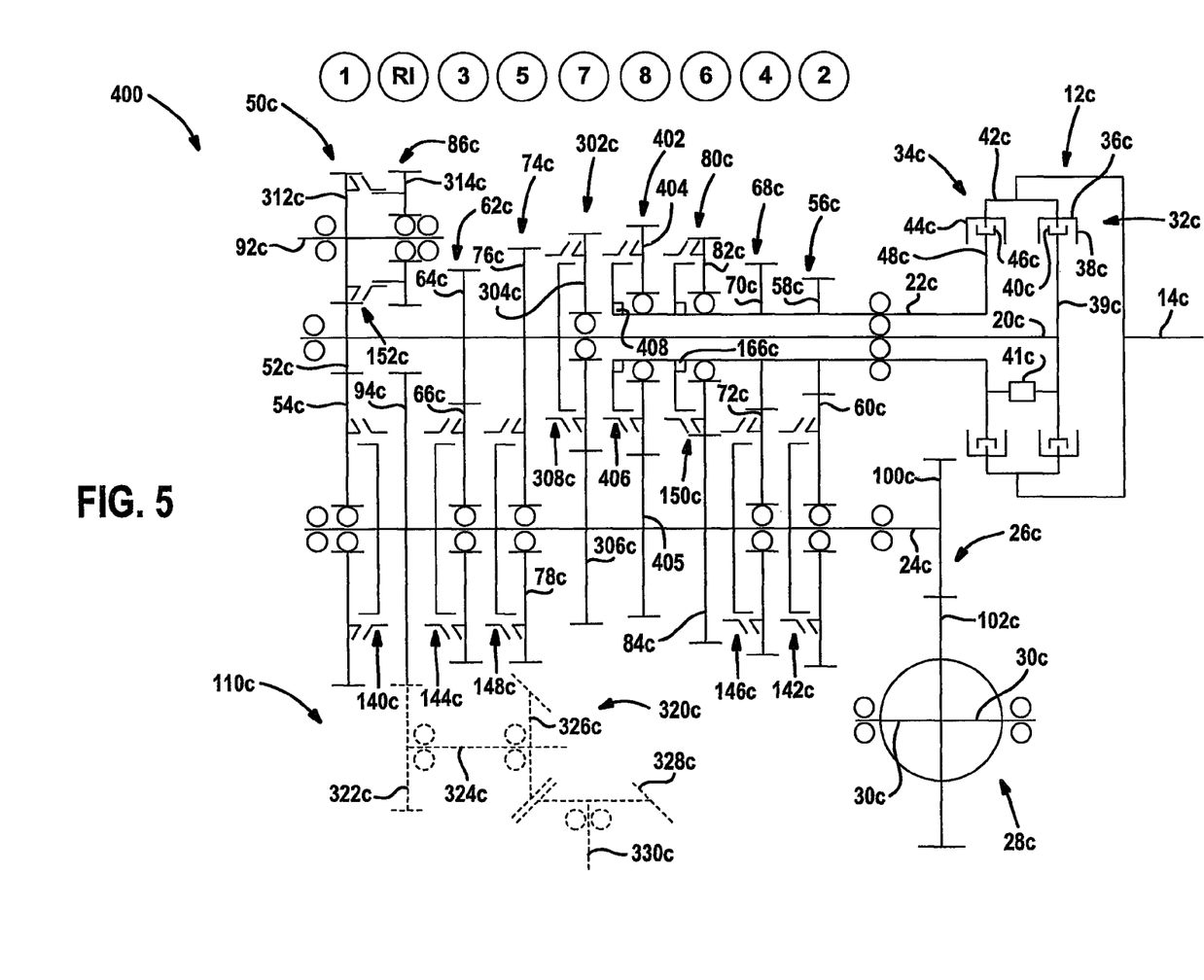
FIG. 5 is a schematic depicting an eight-speed, dual clutch transmission.

FIG. 5 depicts an eight speed automatic power shift transmission identified at reference numeral 400. Transmission 400 is equipped with individual synchronizer clutches associated with each speed gearset in a manner substantially similar to transmission 300. As such, like elements are identified with the previously introduced reference numerals having a "c" suffix. Transmission 400 differs from transmission 300 only in that an eighth speed gearset 402 is included to provide an eighth forward speed gear ratio. Eighth speed gearset 402 includes an eighth drive gear 404 supported for rotation on second input shaft 22c. An eighth driven gear 405 is fixed for rotation with countershaft 24c. A ninth synchronizer clutch 406 is moveable by a ninth actuator 408 to selectively drivingly couple eighth drive gear 404 with second input shaft 22c to provide the eighth speed gear ratio. Transmission 400 may also be configured as a two wheel drive or all wheel drive device in the manner previously described.

Figure 6:
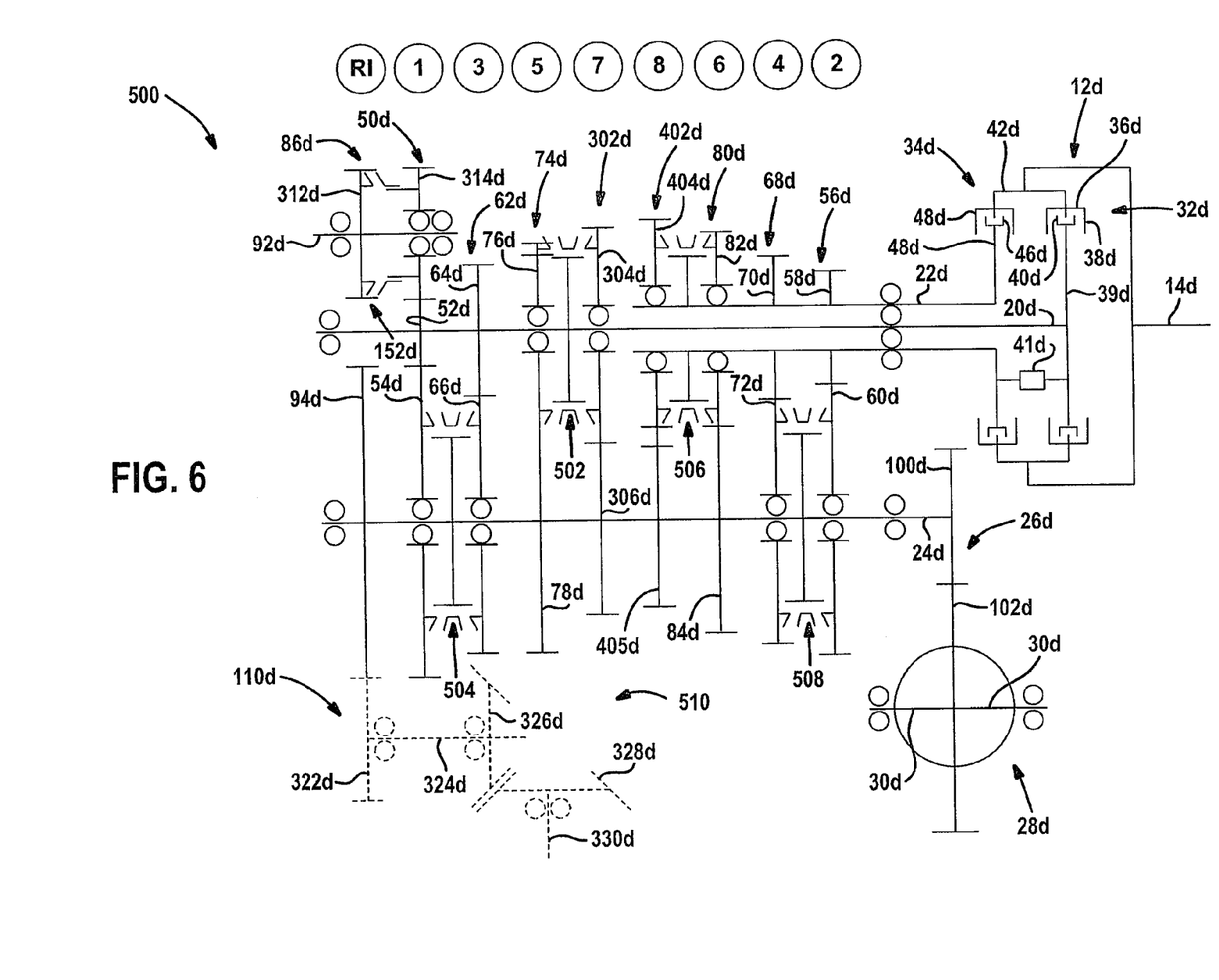
FIG. 6 is a schematic depicting another eight-speed, dual clutch transmission having dual synchronizers.

FIG. 6 depicts another eight speed automatic transmission identified at reference numeral 500. The gearing arrangement of transmission 500 is substantially similar to the gear arrangement of transmission 400 with the exception that dual synchronizer clutches replace many of the individual synchronizer clutches previously described. Again, common elements are now identified with a "d" suffix. Additionally, fifth speed drive gear 76d is rotatably supported on first input shaft 20d. Fifth speed driven gear 78d is fixed for rotation with countershaft 24d. In this manner, a first dual synchronizer clutch and actuator assembly 502 may be positioned between fifth drive gear 76d and seventh drive gear 304d to selectively drivingly interconnect these drive gears to first input shaft 20d. A second dual synchronizer clutch and actuator assembly 504 selectively drivingly interconnects first driven gear 54d or third driven gear 66d to countershaft 24d. A third dual synchronizer clutch and actuator assembly 506 is positioned between eighth drive gear 404d and sixth drive gear 82d to selectively drivingly interconnect one of these gears with second input shaft 22d. A fourth dual synchronizer clutch and actuator assembly 508 is positioned between second driven gear 60d and fourth driven gear 72d and second driven gear 60d to individually and selectively drivingly interconnect one of these driven gears with countershaft 24d. It should be appreciated that the various synchronizer clutches and actuators previously described solely or as assemblies may be constructed as integrated units or as actuators separate from the synchronizer clutches.

Transmission 500 also includes an optional power take-off assembly 510. Power take-off assembly 510 is substantially similar to the bevel or hypoid power take-off assemblies previously described except that it is positioned further from dual input clutch assembly 12d due to the axial change of position of first driven gear 54d and reverse driven gear 94d.

Figure 7:
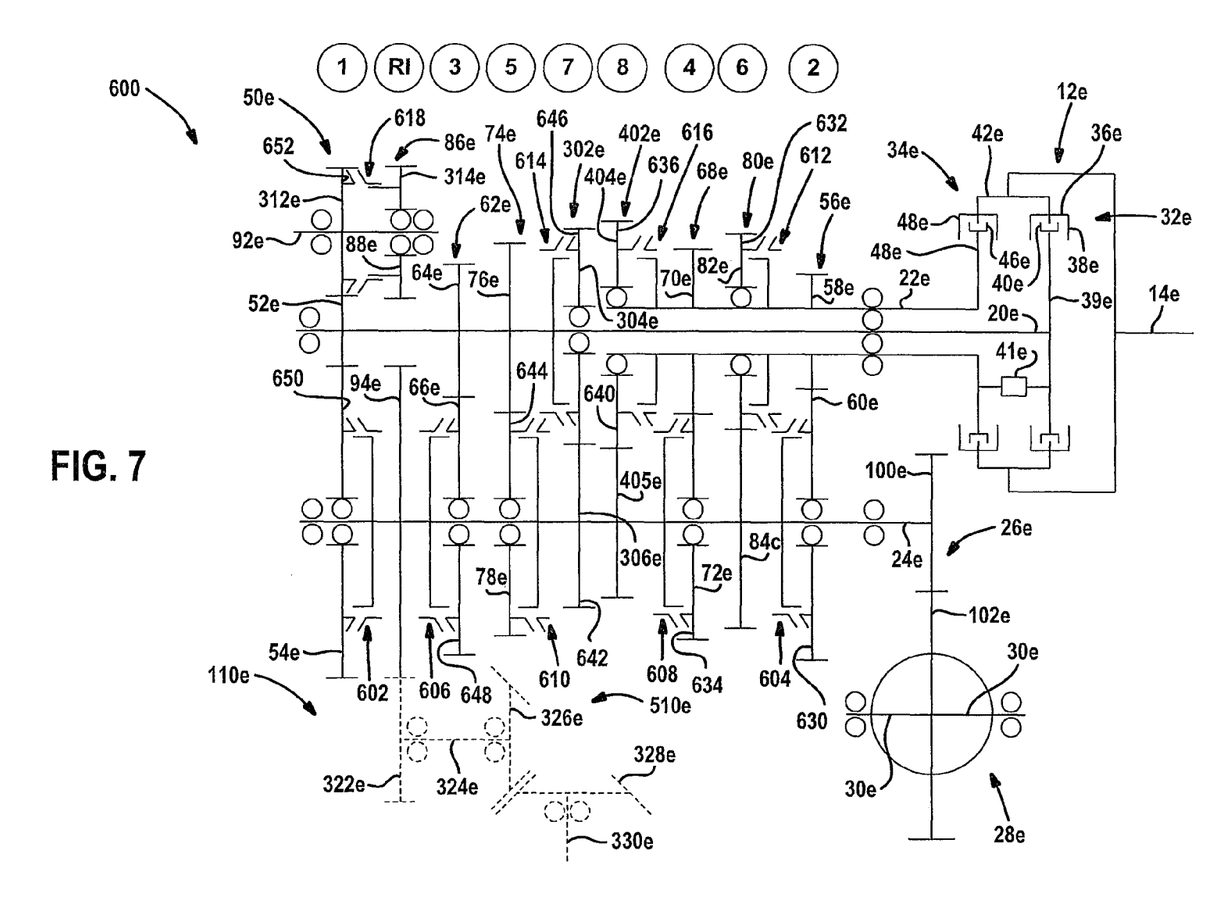
FIG. 7 is a schematic depicting an eight-speed, dual clutch transmission having nested gears and synchronizers.

FIG. 7 depicts another eight speed automatic transmission having individual synchronizer clutches associated with each speed gearset and identified at reference numeral 600. The axial positioning of various speed gearsets has been varied when compared to the transmissions previously discussed to reduce the overall length of transmission 600. To further facilitate an axial length reduction, reduced diameter synchronizer clutches are used in conjunction with the larger of the drive or driven gear for a particular speed gearset such that at least a portion of the synchronizer clutch is nested within a pocket formed within the speed gear. The axial space occupied by a nested speed gear and synchronizer clutch arrangement is less than the space typically occupied by a speed gear and synchronizer combination. The speed gearsets are substantially similar to those previously described. As such, like elements will retain their previously introduced numerals including an "e" suffix.

The gearsets are arranged to not only minimize the overall axial length of transmission 600 but also the weight. As such, the length of second input shaft 22e may be minimized by positioning each of the even numbered gearsets closest to dual clutch assembly 12e. From right to left as viewed in FIG. 7, the gearsets are axially arranged in sequence as second speed gearset 56e, sixth speed gearset 80e, fourth speed gearset 68e, eighth speed gearset 402e, seventh speed gearset 302, fifth speed gearset 74e, third speed gearset 62e, reverse speed gearset 86e and first speed gearset 50e. The relative axial position of the various synchronizer clutches to other synchronizer clutches as well as the axial position of each synchronizer clutch relative to its respective speed gear may also allow further nesting of components to reduce the axial length of transmission 600. Accordingly, the position of each synchronizer clutch will be described.

First through ninth synchronizer clutch and actuator assemblies 602, 604, 606, 608, 610, 612, 614, 616 and 618, are depicted in FIG. 7. The first through eighth synchronizer clutches are associated with the first through eighth speed gearsets, respectively. Ninth synchronizer clutch and actuator assembly 618 is associated with second reverse idler gear 314e. To compress the axial length required to package second speed gearset 56e, sixth speed gearset 80e and their respective synchronizer clutches, second synchronizer clutch and actuator assembly 604 is positioned in cooperation with countershaft 24e axially between second speed gearset 56e and sixth speed gearset 80e. Sixth synchronizer clutch and actuator assembly 612 is also axially positioned between second speed gearset 56e and sixth speed gearset 80e but is positioned in cooperation with second input shaft 22e. The reduced axial length is achieved by positioning second synchronizer clutch and actuator assembly 604 within a pocket 630 formed in second driven gear 60e, positioning sixth synchronizer clutch and actuator assembly 612 within a pocket 632 formed in sixth drive gear 82e and at least partially axially overlapping second synchronizer clutch and actuator assembly 604 with sixth synchronizer and actuator assembly 612.

Fourth speed gearset 68e, eighth speed gearset 402e, fourth synchronizer clutch and actuator assembly 608 and eighth synchronizer clutch and actuator assembly 616 are positioned in a similar nested arrangement. For example, fourth synchronizer clutch and actuator assembly 608 is positioned within a recess 634 formed in fourth driven gear 72e. Eighth synchronizer clutch and actuator assembly 616 is positioned within a recess 636 formed in eighth drive gear 404e. Fourth synchronizer clutch and actuator assembly 608 and eighth synchronizer clutch and actuator assembly 616 at least partially axially overlap with one another as well.

To further reduce the axial length of transmission 600, fifth speed gearset 74e, seventh speed gearset 302e, fifth synchronizer clutch and actuator assembly 610 and seventh synchronizer clutch and actuator assembly 614 are arranged as a nested package. It should also be appreciated that seventh speed gearset 302e may be positioned in at least a partially axially overlapping manner with eighth speed gearset 402e. In particular, seventh drive gear 304e is positioned within a pocket 640 formed in eighth drive gear 404e. Similarly, eighth driven gear 405e is positioned within a pocket 642 formed in seventh driven gear 306e.

Fifth synchronizer clutch and actuator assembly 610 is positioned within a pocket 644 formed in fifth driven gear 78e while seventh synchronizer clutch and actuator assembly 614 is positioned within a pocket 646 formed in seventh drive gear 304e. Fifth synchronizer clutch and actuator assembly 610 at least partially axially overlaps seventh synchronizer clutch and actuator assembly 614.

Other condensed packaging arrangements include positioning third synchronizer clutch and actuator assembly 606 within a pocket 648 formed in third driven gear 66e. First synchronizer clutch and actuator assembly 602 is positioned within a recess 650 formed in first driven gear 54e. Ninth synchronizer clutch and actuator assembly 618 is positioned within a recess 652 formed in first reverse idler gear 312e.

Transmission 600 may be configured to provide torque to a two wheel drive vehicle or may include a power take-off to provide drive torque to all four wheels of a vehicle. The power take-off may include a bevel gearset or a worm gear arrangement as shown in FIG. 2.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A transmission comprising:
   a first input shaft;
   a second input shaft;
   a first input clutch adapted to drivingly couple a power source to the first input shaft;
   a second input clutch adapted to drivingly couple the power source to the second input shaft;
   a countershaft;
   first, third and fifth drive gears driven by the first input shaft;
   second, fourth and sixth drive gears driven by the second input shaft;
   first, second, third, fourth, fifth and sixth driven gears selectively driving the countershaft, the first, second, third, fourth, fifth and sixth drive gears being in meshed engagement with the corresponding first, second, third, fourth, fifth and sixth driven gears;
   a power take-off unit having a gear in constant meshed engagement with one of the first through sixth driven gears; and
   first through sixth synchronizer clutches individually associated with the respective first through sixth drive or driven gears to provide first through sixth gear drive ratios to the countershaft, each synchronizer clutch being selectively actuated by an associated first through sixth electric actuator.

2. The transmission of claim 1 further including a final drive having an output gear driven by the countershaft and a differential driven by the final drive.

3. The transmission of claim 1 further including a reverse gearset including a reverse drive gear driven by the first input shaft, a reverse driven gear driving the countershaft and a reverse idler gear in constant meshed engagement with the reverse drive and the reverse driven gears.

4. The transmission of claim 3 further including a second reverse idler gear in constant meshed engagement with one of the first through sixth drive gears and a reverse synchronizer clutch being operable to drivingly interconnect the reverse idler gear with the second reverse idler gear.

5. The transmission of claim 4 wherein the reverse idler gear is rotatable about an idler shaft and the second reverse idler gear is fixed for rotation with the idler shaft.

6. The transmission of claim 1 wherein the power take-off includes an output shaft rotating about an axis positioned substantially perpendicular to a rotary axis of the countershaft.

7. The transmission of claim 1 further including a common power-operated actuator for controlling the coordinated operation of the first and second input clutches.

8. The transmission of claim 1 further including a seventh drive gear driven by the first input shaft and in meshed engagement with a seventh driven gear driving the countershaft.

9. A transmission comprising:
   a first input shaft;
   a second input shaft;
   a first input clutch adapted to drivingly couple a rotary power source to the first input shaft;
   a second input clutch adapted to drivingly couple the rotary power source to the second input shaft;
   a countershaft driven by first and third gearsets associated with the first input shaft as well as second and fourth gearsets associated with the second input shaft;
   a first synchronizer clutch for drivingly interconnecting one gear of the first gearset to the first input shaft; and
   a third synchronizer clutch for drivingly interconnecting one gear of the third gearset to the countershaft, wherein the first and third synchronizer clutches are axially positioned between the first and third gearsets, the first synchronizer clutch being positioned within a recess formed in the one gear of the first gearset, the third synchronizer clutch being positioned within a recess formed in the one gear of the third gearset.

10. The transmission of claim 9 wherein the first and third synchronizer clutches at least partially axially overlap one another.

11. The transmission of claim 9 further including a second synchronizer clutch for drivingly interconnecting one gear of the second gearset to the second input shaft; and
   a fourth synchronizer clutch for drivingly interconnecting one gear of the fourth gearset to the countershaft, wherein the second and fourth synchronizer clutches are axially positioned between the second and fourth gearsets, the second synchronizer clutch being positioned within a recess formed in the one gear of the second gearset, the fourth synchronizer clutch being positioned in a recess formed in the one gear of the fourth gearset.

12. The transmission of claim 11 wherein the second and fourth synchronizer clutches at least partially axially overlap one another.

13. The transmission of claim 9 wherein the first synchronizer clutch includes a member fixed for rotation with the first input shaft.

14. The transmission of claim 9 further including a final drive having an output gear driven by the countershaft and a differential driven by the final drive.

15. The transmission of claim 9 further including a power take-off unit having a gear in constant meshed engagement with one of the first through fourth gearsets.

16. The transmission of claim 11 wherein the first, second, third and fourth synchronizer clutches are positionable by first, second, third and fourth electric actuators.

17. The transmission of claim 9 further including a reverse gearset including a reverse drive gear driven by the first input shaft, a reverse driven gear driving the countershaft and a first reverse idler gear in constant meshed engagement with the reverse drive and the reverse driven gears, and further including a second reverse idler gear in constant meshed engagement with one of the first through fourth gearsets and a reverse synchronizer clutch operable to drivingly interconnect the first reverse idler gear with the second reverse idler gear.

* * * * *